(12) United States Patent
Stevens

(10) Patent No.: US 9,759,881 B2
(45) Date of Patent: Sep. 12, 2017

(54) OPTICAL CONNECTOR AND CIRCUIT BOARD ASSEMBLIES

(71) Applicant: Xyratex Technology Limited, Havant (GB)

(72) Inventor: Paul Stevens, Bognor Regis (GB)

(73) Assignee: XYRATEX TECHNOLOGY LIMITED, Havant (GB)

( * ) Notice: Subject to any disclaimer, the term of this patent is extended or adjusted under 35 U.S.C. 154(b) by 0 days.

(21) Appl. No.: 14/700,538

(22) Filed: Apr. 30, 2015

(65) Prior Publication Data

US 2015/0316730 A1 Nov. 5, 2015

(30) Foreign Application Priority Data

May 1, 2014 (GB) .................................. 1407723.4

(51) Int. Cl.
*G02B 6/38* (2006.01)
*G02B 6/42* (2006.01)

(52) U.S. Cl.
CPC ......... *G02B 6/4292* (2013.01); *G02B 6/3882* (2013.01); *G02B 6/428* (2013.01); *G02B 6/3885* (2013.01); *Y10T 29/49131* (2015.01)

(58) Field of Classification Search
CPC ................................ G02B 6/38; G02B 6/3882
USPC .......................................................... 385/52
See application file for complete search history.

(56) References Cited

U.S. PATENT DOCUMENTS

| | | | | |
|---|---|---|---|---|
| 5,548,677 A * | 8/1996 | Kakii et al. | | 385/92 |
| 5,625,730 A * | 4/1997 | Ishikawa et al. | | 385/49 |
| 6,456,766 B1 * | 9/2002 | Shaw et al. | | 385/47 |
| 6,485,192 B1 * | 11/2002 | Plotts et al. | | 385/75 |
| 6,588,943 B1 * | 7/2003 | Howard | | 385/88 |
| 7,473,038 B2 * | 1/2009 | Fujiwara et al. | | 385/88 |
| 8,599,568 B2 * | 12/2013 | Gupta et al. | | 361/752 |
| 2004/0067027 A1 * | 4/2004 | Plotts et al. | | 385/75 |
| 2004/0114875 A1 * | 6/2004 | Mattsen | | 385/53 |
| 2004/0184737 A1 * | 9/2004 | Oono et al. | | 385/52 |
| 2005/0205771 A1 * | 9/2005 | Sherrer et al. | | 250/239 |

(Continued)

FOREIGN PATENT DOCUMENTS

| WO | WO 94/28448 A1 | 12/1994 |
|---|---|---|
| WO | WO 01/90793 A1 | 11/2001 |
| WO | WO 2012/079819 A1 | 6/2012 |

OTHER PUBLICATIONS

GB 1407723.4 (AF2/P18634GB), filed May 1, 2014; Combined Search and Examination Report, issued Nov. 4, 2015; 3 pages.

*Primary Examiner* — Kaveh C Kianni
(74) *Attorney, Agent, or Firm* — Mueting, Raasch & Gebhardt, P.A.

(57) ABSTRACT

An exemplary optical connector assembly may include a substrate of an optical printed circuit board (OPCB) with at least one optical device thereon, the substrate including one or more recesses, an optical connector with one or more alignment members for coupling an end of an optical waveguide to the optical device, and one or more inserts, each having an orifice for receiving one of the one or more alignment members and each arranged to be received in one of the one or more recesses. When assembled, the one or more inserts may be received in the one or more recesses and the one or more alignment members may be received in the orifices of the one or more inserts thereby coupling the optical waveguide to the substrate to form the exemplary optical connector assembly.

12 Claims, 8 Drawing Sheets

(56) References Cited

U.S. PATENT DOCUMENTS

| | | |
|---|---|---|
| 2006/0088254 A1* | 4/2006 | Mohammed ............... 385/92 |
| 2006/0098923 A1* | 5/2006 | Fujiwara et al. ............ 385/88 |
| 2006/0164738 A1* | 7/2006 | Yamamoto et al. ......... 359/871 |
| 2007/0086723 A1* | 4/2007 | Sasaki et al. ............... 385/137 |
| 2007/0092185 A1* | 4/2007 | Sasaki ........................ 385/89 |
| 2007/0176057 A1* | 8/2007 | Sharman ..................... 248/65 |
| 2009/0186305 A1* | 7/2009 | Hodono ....................... 430/321 |
| 2009/0202203 A1 | 8/2009 | Budd et al. |
| 2011/0243507 A1 | 10/2011 | Kim et al. |
| 2013/0016947 A1* | 1/2013 | Roitberg et al. ............. 385/60 |
| 2013/0156386 A1* | 6/2013 | Miller ......................... 385/93 |
| 2013/0195396 A1* | 8/2013 | Julien et al. ................ 385/14 |
| 2013/0198414 A1* | 8/2013 | Julien et al. ................ 709/249 |
| 2013/0336619 A1* | 12/2013 | Son et al. .................... 385/89 |
| 2014/0029900 A1* | 1/2014 | Logan et al. ................ 385/92 |
| 2014/0044395 A1* | 2/2014 | Waldron et al. ............ 385/60 |
| 2014/0105540 A1* | 4/2014 | Chen ........................... 385/59 |
| 2014/0294339 A1* | 10/2014 | Lagziel et al. .............. 385/14 |
| 2015/0205061 A1* | 7/2015 | Tan et al. .................... 385/14 |

\* cited by examiner

OPTICAL CONNECTOR AND CIRCUIT BOARD ASSEMBLIES

RELATED APPLICATION

This application claims the benefit of U.K. Patent Application Ser. No. GB 1407723.4 entitled "An Optical Connector Assembly, an Optical Printed Circuit Board Assembly, an Insert, and a Method of Manufacturing an Optical Connector Assembly" and filed on May 1, 2014, which is incorporated herein by reference in its entirety.

The present disclosure relates to an optical connector assembly, an optical printed circuit board assembly, an insert, and a method of manufacturing an optical connector assembly.

SUMMARY

One exemplary assembly may include an optical connector, an optical printed circuit board (OPCB), and one or more inserts (e.g., the inserts may be coupled together defining a unitary component, including high-density thermoplastic material). The optical connector may include a main body and one or more alignment members extending from the main body, and the main body may include a plurality of connector waveguides. The OPCB may include a substrate (e.g., including glass material), and the substrate may include a plurality of circuit waveguides corresponding to the plurality of connector waveguides and may define one or more recesses (e.g., each recess may define a chamfered rim, each recess may extend extending entirely through the substrate). The one or more inserts may be coupled to and located within the one or more recesses of the substrate. Each insert may define an orifice configured to receive an alignment member of the optical connector to align the plurality of connector waveguides with the plurality of circuit waveguides when the optical connector is coupled to the OPCB.

One exemplary circuit board may include a substrate (e.g., including glass material) and one or more inserts (e.g., the inserts may be coupled together defining a unitary component, including high-density thermoplastic material). The substrate may include a plurality of circuit waveguides corresponding to a plurality of connector waveguides of an optical connector and may define one or more recesses (e.g., each recess may define a chamfered rim, each recess may extend extending entirely through the substrate). The one or more inserts may be coupled to and located within the one or more recesses of the substrate. Each insert may define an orifice configured to receive an alignment member of the optical connector to align the plurality of connector waveguides with the plurality of circuit waveguides when the optical connector is coupled to the substrate.

In one or more embodiments, the one or more inserts may include at least one restriction element configured to restrict the one or more inserts from being removed from the one or more recesses in a direction towards the optical connector when the optical connector is coupled to the OPCB. Further, the one or more inserts may extend from a first end to a second end along an axis and the at least one restriction element may include a flange extending radially proximate the first end. The flange may be located on the opposite of the substrate than the optical connector when the optical connector is coupled to the OPCB.

In one or more embodiments, the main body defining a planar connector coupling surface and the substrate defining a planar substrate coupling surface configured to be mated with the planar connector coupling surface when the optical connector is coupled to the OPCB. In one or more embodiments, the coefficient of thermal expansion of the one or more inserts equaling the coefficient of thermal expansion of the substrate.

One exemplary method may include providing an optical connector (e.g., including a main body and one or more alignment members extending from the main body, the main body may include a plurality of connector waveguides), providing a substrate (e.g., the substrate may include a plurality of circuit waveguides corresponding to the plurality of connector waveguides), defining one or more recesses in the substrate, and adding one or more inserts to and located within the one or more recesses of the substrate. Each insert may define an orifice configured to receive an alignment member of the optical connector to align the plurality of connector waveguides with the plurality of circuit waveguides when the optical connector is coupled to the substrate.

In one or more embodiments, defining one or more recesses in the substrate may include maneuvering the optical connector about the substrate to align the plurality of connector waveguides with the plurality of circuit waveguides and forming the one or more recesses in the substrate based on the position of the optical connector when the plurality of connector waveguides are aligned with the plurality of circuit waveguides.

In one or more embodiments, the method may further include, after the one or more inserts are coupled to and located within the one or more recesses, defining the orifice in each of the one or more inserts by maneuvering the optical connector about the substrate to align the plurality of connector waveguides with the plurality of circuit waveguides and forming the orifice in each of the one or more inserts based on the position of the optical connector when the plurality of connector waveguides are aligned with the plurality of circuit waveguides.

One exemplary optical connector assembly may include a substrate (e.g., comprising or formed from a glass material) of an optical printed circuit board (OPCB) with at least one optical device thereon, the substrate including one or more recesses (e.g., each of the one or more recesses defining or including a chamfered rim), an optical connector with one or more alignment members for coupling an end of an optical waveguide to the optical device, and one or more inserts (e.g., comprising or formed from a high density thermoplastic), each having an orifice for receiving one of the one or more alignment members and each arranged to be received in one of the one or more recesses. When assembled, the one or more inserts may be received in the one or more recesses and the one or more alignment members may be received in the orifices of the one or more inserts, thereby coupling the optical waveguide to the substrate to form the optical connector assembly.

One exemplary optical printed circuit board (OPCB) assembly may include a substrate (e.g., comprising or formed from a glass material) for receiving or supporting at least one optical device thereon, the substrate having one or more recesses (e.g., each of the one or more recesses defining or including a chamfered rim) and one or more inserts (e.g., comprising or formed from a high density thermoplastic), each having an orifice for receiving an alignment member of an optical connector and each arranged to be received in one of the one or more recesses.

In at least one embodiment, at least one of the one or more recesses is arranged to extend through the substrate to form an eyelet. Further, at least one of the one or more inserts may be tubular. Further, at least one of the one or more inserts may be arranged to be received in the eyelet. Still further, at least one of the one or more inserts may include a flange, and the flange and the optical connector may be arranged to be on opposing sides of the substrate when the optical connector assembly is assembled.

In at least one embodiment, the one or more inserts are joined by one or more connecting portions to form a unitary component. Further, the coefficient of thermal expansion of the one or more inserts may be the same as the coefficient of thermal expansion of the substrate.

One exemplary an insert (e.g., comprising or formed from a high density thermoplastic) for an optical printed circuit board (OPCB) assembly may include at least one orifice for receiving an alignment member of an optical connector, and the insert may be arranged to be received in at least one recess of a substrate of the OPCB. In at least one embodiment, the insert may be tubular. In at least one embodiment, the insert may include a flange. Further, in at least one embodiment, the insert may joined to another insert by a connecting portion to form a unitary component. Still further, in at least one embodiment, the coefficient of thermal expansion of the insert may be the same as the coefficient of thermal expansion of the substrate.

One exemplary method of manufacturing an optical connector assembly having a substrate of an optical printed circuit board (OPCB) with at least one optical device thereon, an optical connector with one or more alignment members for coupling an end of an optical waveguide to the optical device, and one or more inserts, each having an orifice for receiving one of the one or more alignment members and each arranged to be received a recess in the substrate, may include providing one or more recesses in the substrate, providing the one or more inserts in the one or more recesses, and coupling the optical connector to the substrate by mating the one or more alignment members with the one or more inserts in the recesses.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Figure 1A:
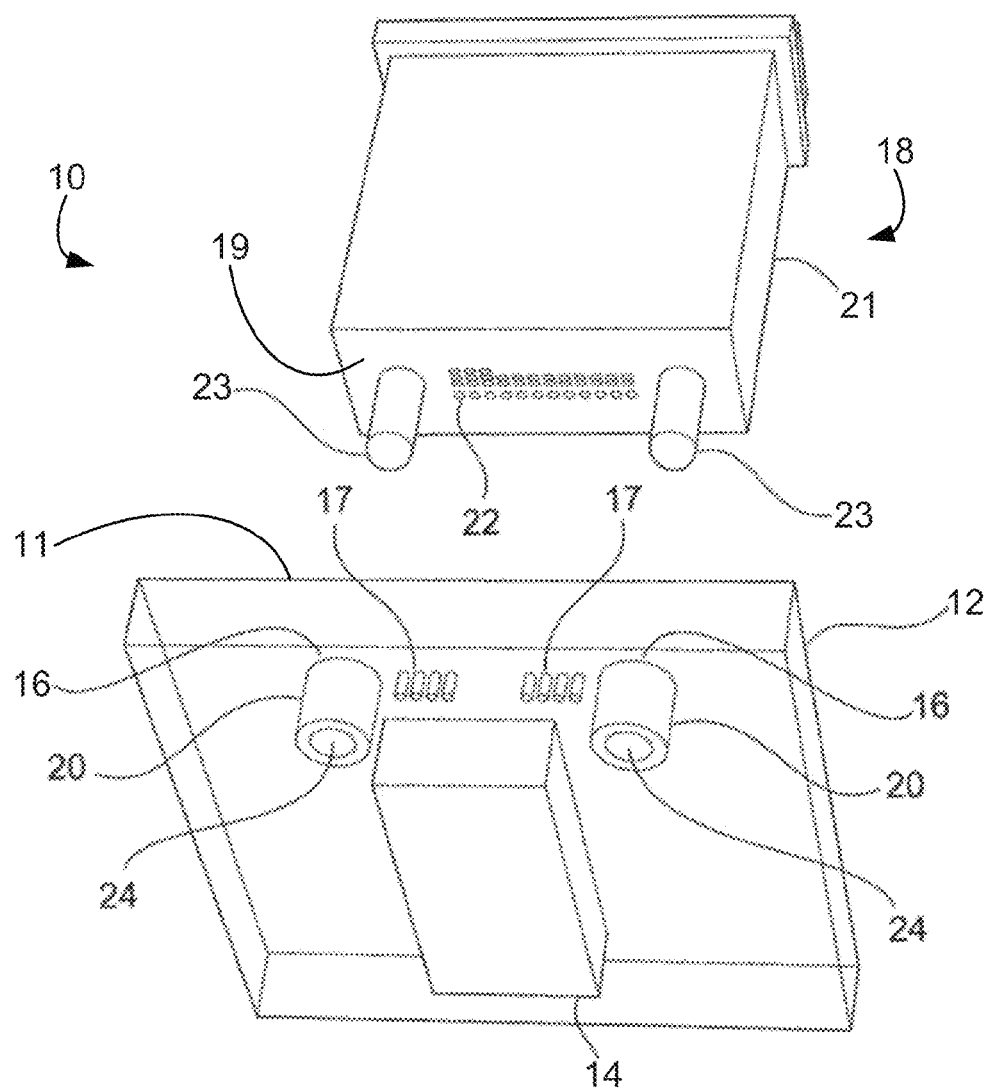
FIG. 1A is a perspective illustration of an embodiment of an optical connector assembly, partially disassembled.

Exemplary apparatus and methods shall be described with reference to FIGS. 1-5. It will be apparent to one skilled in the art that elements or processes from one embodiment may be used in combination with elements or processes of the other embodiments, and that the possible embodiments of such apparatus and methods using combinations of features set forth herein is not limited to the specific embodiments shown in the figures and/or described herein. Further, it will be recognized that timing of the processes and the size and shape of various elements herein may be modified but still fall within the scope of the present disclosure, although certain timings, one or more shapes and/or sizes, or types of elements, may be advantageous over others.

In one or more embodiments, the present disclosure relates to an optical connector assembly having a mechanical transfer ferrule carrying an optical waveguide, such as an optical fibre, coupled directly to the glass substrate of an optical engine. In one or more embodiments, the present disclosure relates to an optical printed circuit board assembly capable of coupling directly with a mechanical transfer ferrule carrying an optical waveguide. In one or more embodiments, the present disclosure relates an insert for the optical printed circuit board assembly. In one or more embodiments, the present disclosure relates to a method of coupling a mechanical transfer ferrule carrying an optical waveguide, such as an optical fibre, directly to the glass substrate of an optical engine.

Copper wire cables may be used to transmit digital information (i.e., data) electronically between two notional points, hereinafter referred to as "point A" and "point B." The maximum performance achievable by transferring data electronically may be restricted due to, e.g., inherent redundancies and physical limitation on data transfer rates. Optical data transfer in photonic and optoelectronic applications may involve encoding digital information into light signals, which are typically transferred from point A to point B via optical fibres, or more generally, via waveguides. Transferring data in this manner may be more efficient, may afford greater bandwidth, and may be less liable to interference than electronic data transfer.

Exemplary photonic/optoelectronic devices may include various photonic/optoelectronic components on a substrate, such as a printed optical circuit board (OPCB). The various components may be typically connected via waveguides on the OPCB, and one OPCB may be connected to another OPCB or any other apparatus via optical fibres. Connectors may be used to connect the optical fibre or bundle of optical fibres of one OPCB to those of another OPCB or any other apparatus, thereby coupling the photonic/optoelectronic components of one OPCB to those of another OPCB or any other apparatus. Due to the delicate nature of OPCBs, which may be made of glass, optical connectors such as mechanical transfer (MT) ferrules may be used to connect the optical fibres together.

A MT ferrule may include a hard casing into which end sections of optical fibres may be received and may define apertures to expose the end tips of the optical fibres. MT ferrules may be divided into the two following types: a male type; and a female type. The casing of the male type may include a number of alignment pins, which are arranged to mate with a number of holes in the casing of the female type.

The pins and holes may be provided to ensure that the ends of the optical fibres are properly aligned to allow uninterrupted propagation of light signals. In at least one exemplary connector assembly, a bundle of optical fibres may be mounted on an OPCB such that one end of the bundle is coupled to the inputs/outputs of the OPCB and the other end of the bundle may be coupled to a male/female type MT ferrule to enable the OPCB to connect to another OPCB via a corresponding female/male type MT ferrule.

MT ferrules as optical connectors can be used to couple ends of optical fibres. MT ferrules as optical connects can also be used in an optical fibre assembly, in which the ferrules are removable without the use of tools. Although these applications of MT ferrules may be able to couple ends of optical fibres together, such MT ferrules may be bulky, complicated, and difficult to manufacture.

Referring to FIG. 1A, an embodiment of an optical connector assembly 10 is shown partially dissembled. In this embodiment, the optical connector assembly 10 may include a substrate 12 of an OPCB and an optical device 14 provided thereon (e.g., coupled thereto), such as any one or more of a waveguide, a beam splitter, a lens, a mirror, a multiplexer or any other optical device. The substrate 12 may include (e.g., be formed from) a glass material such as, e.g., fused silica, and may define a number of recesses 16 provided therein. A plurality of input/output waveguides 17 may be provided on the OPCB as inputs and outputs to the optical device 14. In some examples, the OPCB may have more than one optical device 14. In these examples, the optical devices 14 are interconnected by waveguides (not shown) to enable light signals to transfer from one optical device 14 to another.

Referring still to FIG. 1A, the optical connector assembly 10 may also include an optical connector 18 and a number, or plurality, of inserts 20. In the particular example of FIG. 1A, the optical connector 18 may be a mechanical transfer (MT) ferrule. The optical connector 18 may be configured to receive end portions of one or more optical waveguides (not shown) in a main body 21, and may have, or define, one or more apertures 22 configured to expose the ends of the optical waveguides. The optical connector 18 also may have, or include, a number, or plurality, of alignment members 23, such as pins as shown in FIG. 1A, which protrude, or extend, from the main body 21 of the optical connector 18.

The inserts 20 may each be shaped to have an exterior that compliments the interior of the recesses 16 so that, e.g., when the substrate 12 and/or OPCB is assembled, the inserts 20 may be added (e.g., deposited, coupled to, etc.) to the substrate 12 in the recesses 16 (such the e.g., the inserts fit snuggly into the recesses 16, flush with the planar surface 11 of the substrate 12, etc.). Each insert 20 may also have, or define, an orifice 24 for receiving an alignment member 23. The orifice 24 may be shaped to have interior dimensions that complement the dimensions of the alignment member 23 so as, e.g., to enable the optical connector 18 to couple to the substrate 12 securely.

The inserts 20 may include (e.g., be formed from) a strong, yet resilient, material so as, e.g., to withstand the impact forces that the inserts 20 are subjected to when assembling the optical connector assembly 10 and to provide adequate support to maintain the optical connector 18 in a secured position after the optical connector assembly 10 is assembled. The inserts 20 may also include (e.g., be formed from) a material that has a coefficient of thermal expansion that matches the coefficient of thermal expansion of the material of (e.g., used to form) the substrate 12. In some embodiments, the inserts 20 may include (e.g., be formed from) a plastic material such as high density thermoplastic, or any other suitable material, using known methods such as injection moulding or any known suitable method. The substrate 12 of the optical connector assembly 10 may include (e.g., formed from) glass. In some embodiments, the substrate 12 may include (e.g., be formed from) other suitable glass material.

Figure 1B:
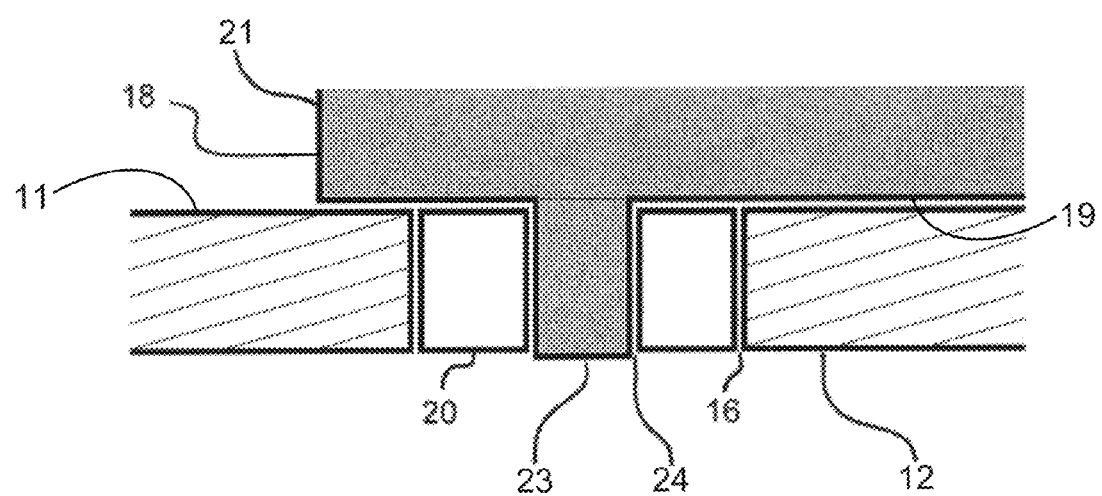
FIG. 1B is a cross-sectional view of a portion of the embodiment shown in FIG. 1B, assembled.
Figure 1C:
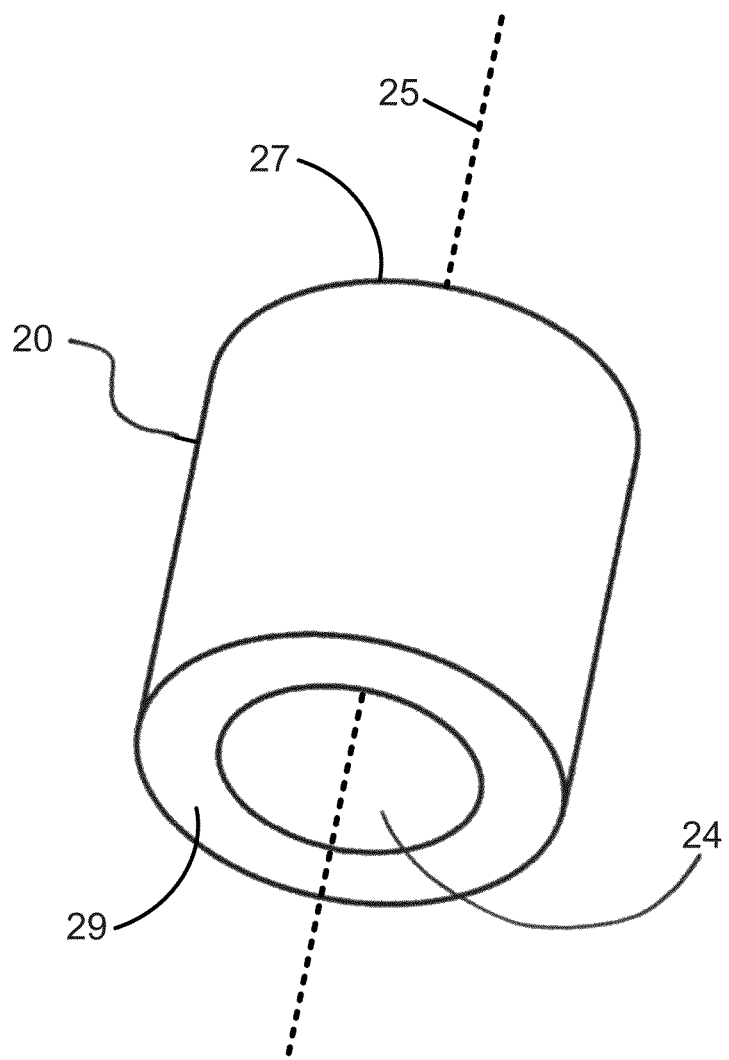
FIG. 1C is a perspective view of an exemplary insert of the embodiment shown in FIG. 1A.

Referring to FIG. 1B, a portion of the exemplary optical connector assembly 10 of FIG. 1A is shown in more detail in a cross-sectional view. As shown in this embodiment, each recess 16 may extend through the substrate 12 to form an eyelet, and the inserts 20 may be tubular in shape for receiving the pin-shaped alignment members 23. An exemplary individual tubular insert 20 extending from a first end 25 to a second end 29 along axis 25 is shown in FIG. 1C. As shown, the orifice 24 may be described as a passageway extending from the first end 27 to the second end 29. Although FIGS. 1A-1C depict tubular-shaped inserts 20, recesses 16 configured to receive the tubular-shaped inserts 20, orifices 24 configured to receive pin-shaped alignment members 23, and pin-shaped alignment members 23 configured to be received by the orifices 24 of the tubular-shaped inserts 20, it will be appreciated that the recesses 16 may have any suitable shape, the inserts 20 may be shaped correspondingly to the recesses 16, the alignment members 23 may have any suitable shape, and the orifices 24 are shaped correspondingly to the alignment members 24.

Figure 2:
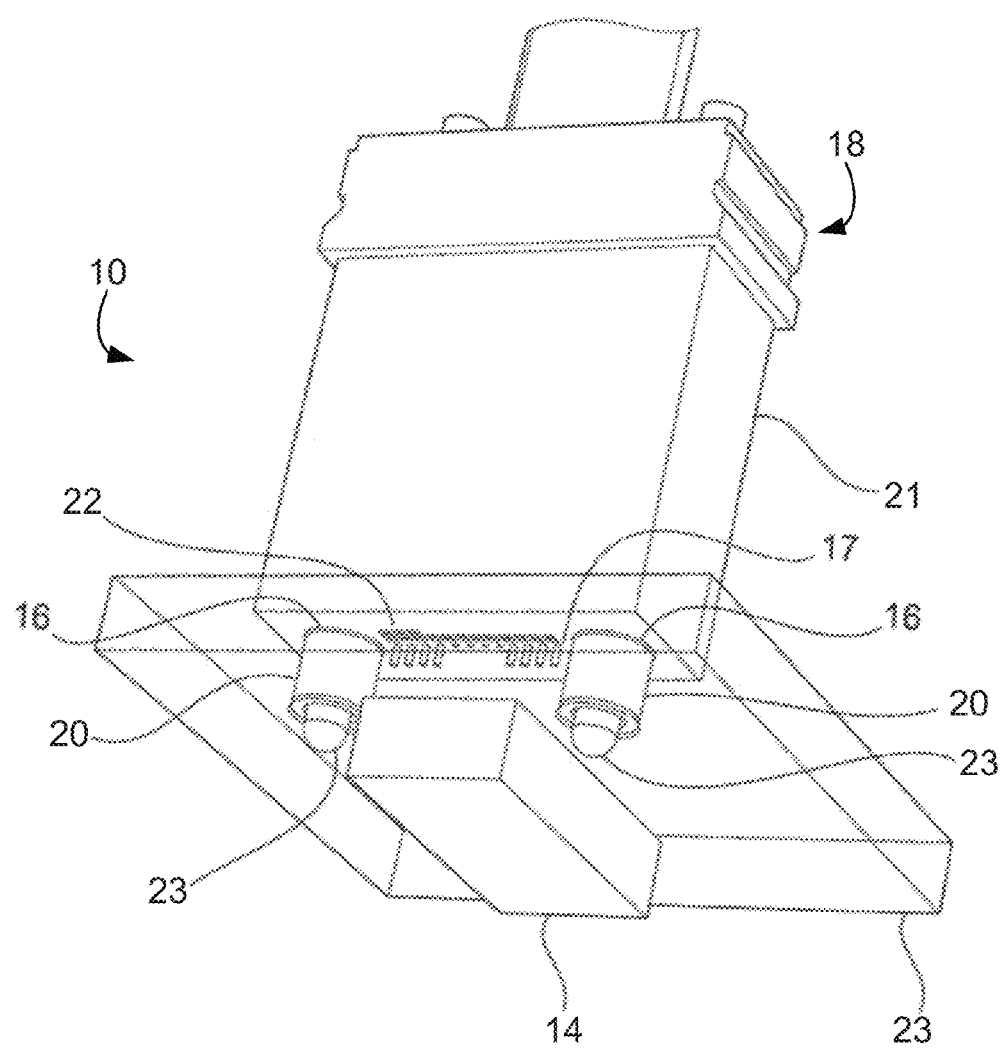
FIG. 2 is a perspective illustration of the embodiment shown in FIG. 1A, assembled.

To assemble the optical connector assembly 10, the inserts 20 may be placed in the recesses 16 of the substrate 12 to form an exemplary OPCB assembly, and the optical connector 18 may be coupled to substrate 12 by mating the alignment members 23 with the inserts 20. As shown in FIG. 2, the recesses 16 may be positioned such that when the optical connector assembly 10 is assembled, the apertures 22 of the optical connector 18 and hence the optical waveguides received therein are aligned with the input/output waveguides 17 of the substrate 12.

Although it may be feasible to mate the alignment members 23 with the recesses 16 directly, collision between the alignment members 23 and the rim of the recess 16 may often occur, which may cause damage to the substrate 12. Damage to the substrate 12 may result in loose particles, which may be undesirable in the optical connector assembly 10. By providing the inserts 20 as buffers between the alignment members 23 and the recesses 16, the alignment members 23 may be prevented from striking edges (e.g., which, in some examples, may be brittle and delicate) of the substrate 12, thereby reducing the risk of damaging the substrate 12 when assembling the optical connector assembly 10.

In the examples shown in FIGS. 1A & 2, the optical connector 18 includes two alignment members 23 and a corresponding number of recesses 16 and inserts 20 are provided. It will however be appreciated that the optical connector 18 may include, or have, any suitable number of alignment members 23, and likewise, and a corresponding number of recesses 16 and inserts 20 may be provided.

Figure 3:
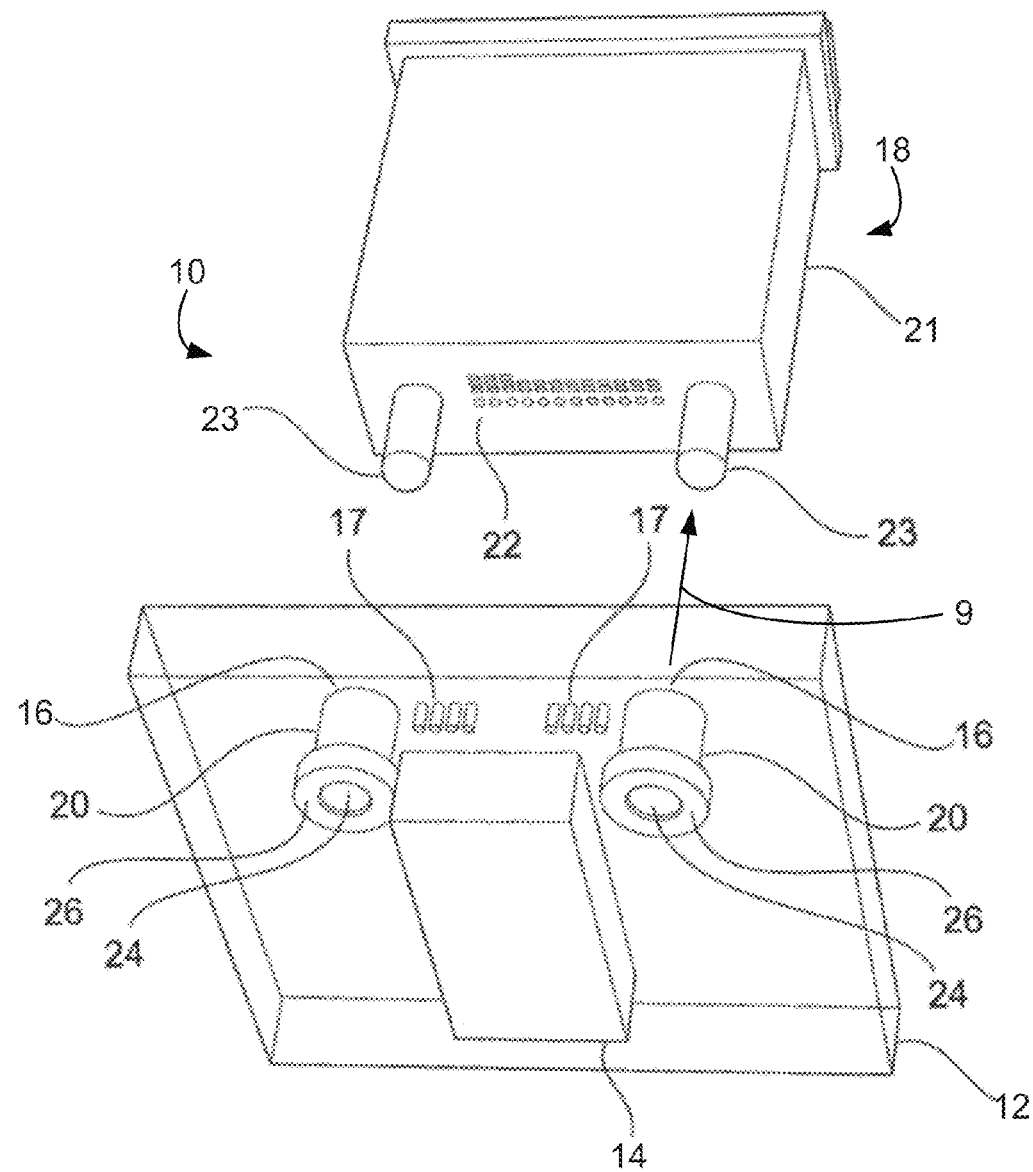
FIG. 3 is a perspective illustration of another embodiment of a partially-disassembled optical connector assembly.

Referring to FIG. 3, another embodiment of the optical connector assembly 10 is shown. In this embodiment, the inserts 20 each may define, or have, a tubular portion and may each include, or be provided with, a restriction element configured to restrict the inserts 20 from being removed from the recesses 16 in a direction 9 towards the optical connector 18 when the optical connector 18 is coupled to the OPCB (e.g., such that when the optical connector 18 is unmated or uncoupled from the OPCB, the restriction element restrictions the insert 20 from moving out of the recess 16). In the embodiment depicted, the restriction element is a flange 26 located at, or proximate to, one end (e.g., the second end 29) of the tubular portion such that, e.g., it may be described that each insert 20 has a "top-hat" profile. Further, the recesses 16 of this embodiment may extend through the substrate 12 to form eyelets and, when the optical connector assembly 10 is assembled, the inserts 20 may be disposed so that the flange 26 and the optical connector 18 are on opposing sides of the substrate 12. By arranging the inserts 20 and the optical connector 18 in this manner, the flange 26 on each of the inserts 20 may restrict (e.g., prevent) the inserts 20 from being removed from the recesses 16 when uncoupling the optical connector 18 from the substrate 12. In some examples of this embodiment, the inserts 20 may be more securely fixed to the substrate 12 by applying an adhesive to the contact surfaces between the inserts 20 and the substrate 12 prior to insertion of the inserts 20 into the recesses 16.

Further, the inserts 20 of the embodiment shown in FIG. 3 may include (e.g., formed from) a strong, yet resilient, material. In some examples, the inserts 20 may include (e.g., be formed from) a plastic material, such as high density thermoplastic. In other examples, the inserts 20 may include (e.g., be formed from) any suitable known material. Further, the inserts 20 may be made, or formed, by injection moulding or any suitable know method.

Figure 4:
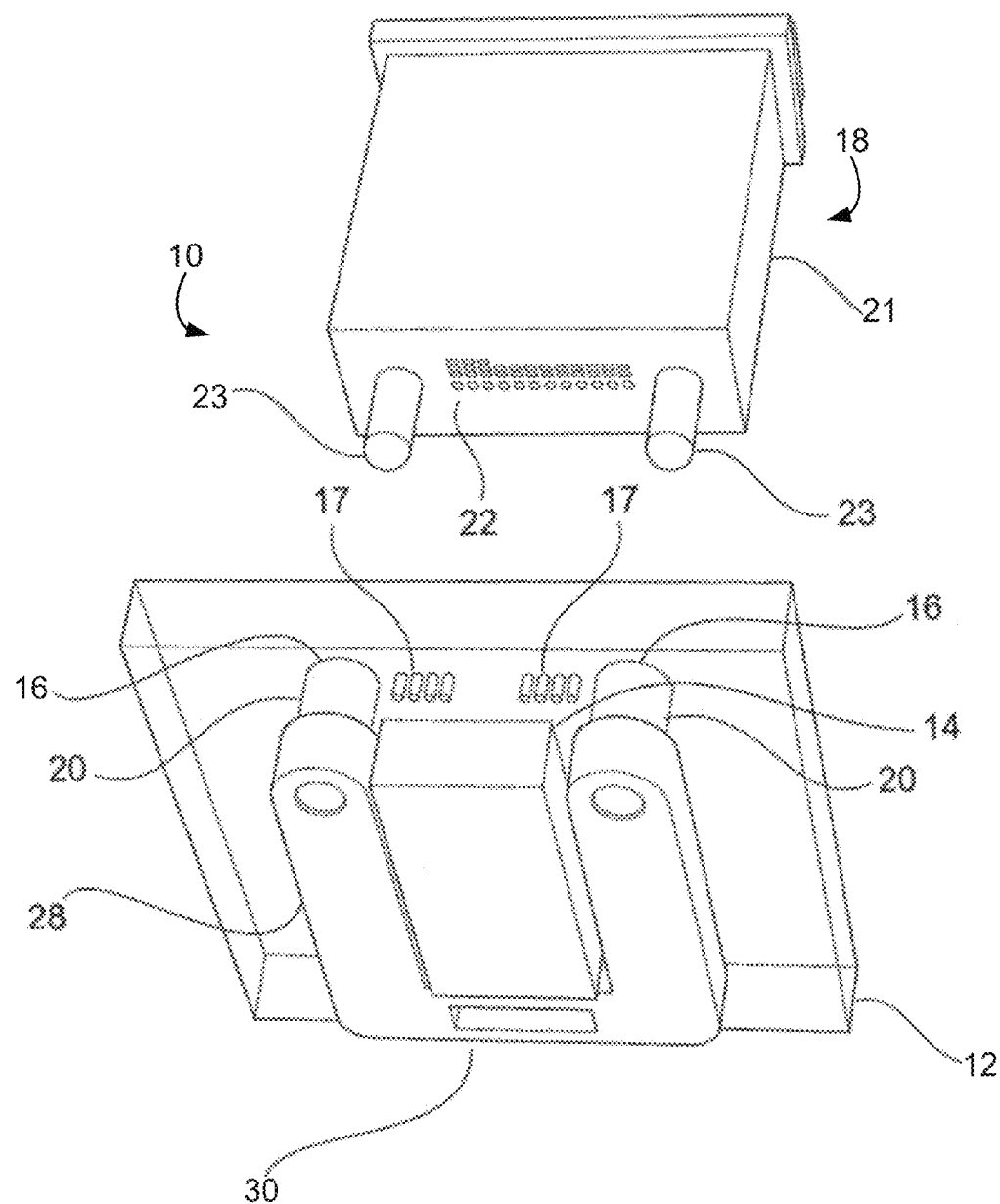
FIG. 4 is a perspective illustration of yet another embodiment of a partially-disassembled optical connector assembly.
Figure 5A:
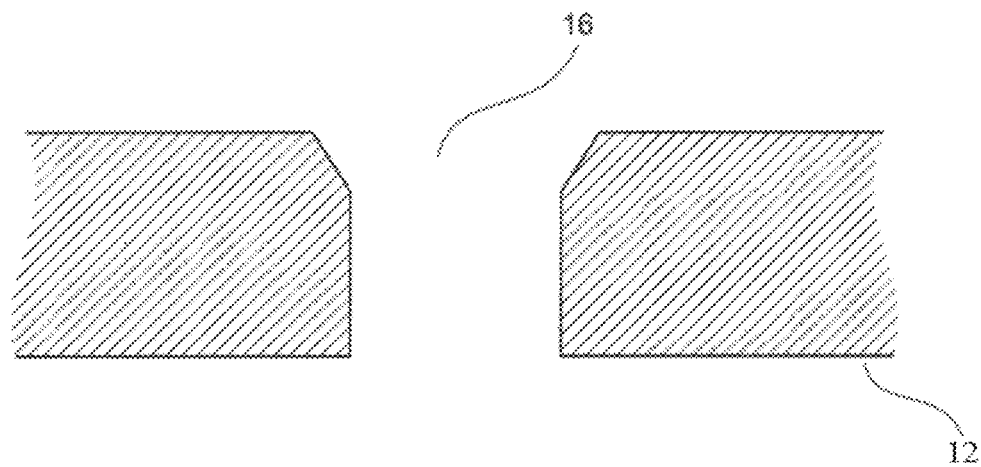
FIGS. 5A-5B are cross-sectional illustrations of an exemplary recess of two embodiments of an optical connector assembly.
Figure 5B:
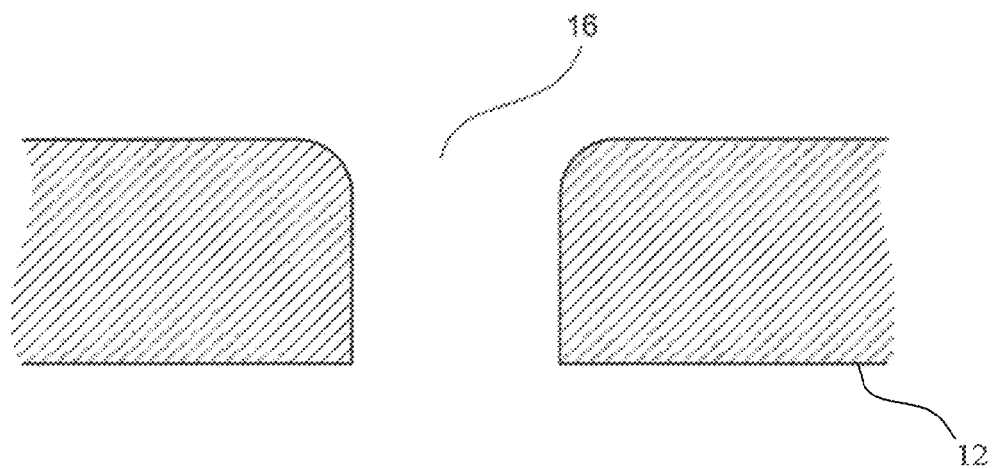

In the embodiments shown in FIGS. 1A, 2, & 3, the inserts 20 may be described as individual components, each formed separately from another. In yet another embodiment, as shown in FIG. 4, the inserts 20 may be coupled, or joined, by a connecting portion 28 to define, or form, an interposer 30. The interposer 30 may be described as a unitary component and may include (e.g., be formed from) the same materials as for the individual inserts 20. The interposer 30 may also be made, or formed, by the same method as for the individual inserts 20. Making the interposer 30 as a unitary component may reduce the complexity of the optical connector assembly 10, which may thereby reduce the manufacturing costs.

In some embodiments of the optical connector assembly 10 described herein, the recesses 16 may be each provided with a cropped rim on the side of the substrate 12 with which the optical connector 18 engages when the optical connector assembly 10 is assembled. In some examples, such as that shown in FIG. 5A, the right-angle edge at the rim of a recess 16 may be removed to provide, or define, a sloping edge, or chamfered edge, at the rim of the recess 16. By providing such a chamfered rim, a potentially-fragile portion of the recess 16 may be removed to further reduce a potential risk of damaging the substrate 12 when assembling the optical connector assembly 10. In other examples, such as that shown in FIG. 5B, the right-angled edge of the rim of the recess 16 may be described as being "rounded off." In at least one embodiment, the edge of the rim of the recess 16 may be cropped, or shaped, by filing or laser cutting. It will be appreciated that the right-angled edge of the rim of the recess 16 may be cropped into any other suitable shape using any other suitable method.

To manufacture the optical connector assembly 10 of the above-described embodiments, the recesses 16 may be formed in the substrate 12 by micro-milling or any other suitable method. Further, the positions of the recesses 16 may be determined by actively using the optical connector 18 and the optical devices 14 on the OPCB. For example, optical signals may be transmitted, or sent down, the optical waveguides located in the apertures 22 that are received in the optical connector 18 and the optical connector 18 may be maneuvered to align the apertures 22 with the input/output waveguides 17 of the substrate 12. Then, by monitoring the status of the optical devices 14, the appropriately-aligned position of the optical connector 18, and thus the appropriately-aligned positions of the recesses 16, may be determined. Once the recesses 16 are formed, the inserts 20 may be provided in the recesses 16 by first depositing solid pieces of high density thermoplastic, or any other aforementioned suitable material, in the recesses 16. The solid pieces may be each shaped so as to fit snuggly in a recess 16. The orifices 24 of the inserts 20 may then be formed by micro-milling or any other suitable method. Further, the position of the orifice 24 may be determined in the same manner as determining the positions of the recesses 16. Next, once the recesses 16 and inserts 20 are located in place, the optical connector 18 is coupled with the substrate 12 by mating the alignment members 23 of the optical connector 18 with the orifices 24 of the inserts 20 to form the optical connector assembly 10.

The methods and/or techniques described in this disclosure, including those attributed to a controller, or any other various constituent components, may be implemented, at least in part, in hardware, software, firmware, or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, embodied in programmers, such as physician or patient programmers, stimulators, image processing devices, or other devices. The term "controller," "module," "processor," or "processing circuitry" may generally refer to any of the foregoing logic circuitry, alone or in combination with other logic circuitry, or any other equivalent circuitry.

In the preceding description, reference is made to the accompanying set of drawings that form a part hereof and in which are shown by way of illustration several specific embodiments. It is to be understood that other embodiments are contemplated and may be made without departing from (e.g., still falling within) the scope or spirit of the present disclosure. The preceding detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

It is noted that terms such as "top", "bottom", "above, "below", etc. may be used in this disclosure. These terms should not be construed as limiting the position or orientation of a structure, but should be used as providing spatial relationship between the structures.

Embodiments of the systems, apparatus, and methods for measuring latency in a storage device are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed is:

1. An assembly comprising:
    an optical connector comprising a main body and one or more alignment members extending from the main body, the main body comprising a plurality of connector waveguides;
    an optical printed circuit board (OPCB) comprising a substrate, the substrate comprising a plurality of input/output waveguides configured to be aligned with the plurality of connector waveguides and defining one or more recesses; and
    one or more inserts coupled to and located within the one or more recesses of the substrate, each insert configured to receive an alignment member of the optical connector to align the plurality of connector waveguides with the plurality of input/output waveguides when the optical connector is coupled to the OPCB, the one or more inserts comprising at least one restriction element configured to restrict the one or more inserts from being removed from the one or more recesses in a direction towards the optical connector when the optical connector is coupled to the OPCB.

2. The assembly of claim 1, the one or more inserts extending from a first end to a second end along an axis and the at least one restriction element comprising a flange extending radially proximate the first end, the flange being located on the opposite of the substrate than the optical connector when the optical connector is coupled to the OPCB.

3. The assembly of claim 1, the main body defining a planar connector coupling surface and the substrate defining a planar substrate coupling surface configured to be mated with the planar connector coupling surface when the optical connector is coupled to the OPCB.

4. The assembly of claim 1, the one or more recesses defining a chamfered rim.

5. The assembly of claim 1, the one or more recesses extending entirely through the substrate.

6. The assembly of claim 1, the one or more recesses comprises two recesses and the one or more inserts comprising the two inserts, the two inserts being coupled together defining a unitary component.

7. The assembly of claim 1, the one or more inserts comprising high-density thermoplastic material.

8. The assembly of claim 1, the substrate comprising glass material.

9. The assembly of claim 1, the coefficient of thermal expansion of the one or more inserts equaling the coefficient of thermal expansion of the substrate.

10. A method comprising:
    providing an optical connector comprising a main body and one or more alignment members extending from the main body, the main body comprising a plurality of connector waveguides;
    providing an optical printed circuit board (OPCB) comprising a substrate, the substrate comprising a plurality of input/output waveguides configured to be aligned with the plurality of connector waveguides;
    defining one or more recesses in the substrate; and
    adding one or more inserts to the one or more recesses of the substrate, each insert configured to receive an alignment member of the optical connector to align the plurality of connector waveguides with the plurality of input/output waveguides when the optical connector is coupled to the OPCB, the one or more inserts comprising at least one restriction element configured to restrict the one or more inserts from being removed from the one or more recesses in a direction towards the optical connector when the optical connector is coupled to the OPCB.

11. The method of claim 10, wherein defining one or more recesses in the substrate comprising:
    maneuvering the optical connector about the substrate to align the plurality of connector waveguides with the plurality of input/output waveguides; and
    forming the one or more recesses in the substrate based on the position of the optical connector when the plurality of connector waveguides are aligned with the plurality of input/output waveguides.

12. The method of claim 10, the method further comprising:
    after adding the one or more inserts to the one or more recesses, defining an orifice in each of the one or more inserts by maneuvering the optical connector about the substrate to align the plurality of connector waveguides with the plurality of input/output waveguides; and
    forming the orifice in each of the one or more inserts based on the position of the optical connector when the plurality of connector waveguides are aligned with the plurality of input/output waveguides.

* * * * *

UNITED STATES PATENT AND TRADEMARK OFFICE
CERTIFICATE OF CORRECTION

| | | |
|---|---|---|
| PATENT NO. | : 9,759,881 B2 | Page 1 of 1 |
| APPLICATION NO. | : 14/700538 | |
| DATED | : September 12, 2017 | |
| INVENTOR(S) | : Paul Stevens | |

It is certified that error appears in the above-identified patent and that said Letters Patent is hereby corrected as shown below:

In the Claims

Column 10, Line 1: "prising the two inserts" should be changed to --prising two inserts--

Signed and Sealed this
Third Day of April, 2018

Andrei Iancu
*Director of the United States Patent and Trademark Office*